US011275980B2

(12) United States Patent
Kubota et al.

(10) Patent No.: US 11,275,980 B2
(45) Date of Patent: Mar. 15, 2022

(54) DISPLAY METHOD AND DISPLAY DEVICE FOR TWO-DIMENSIONAL CODE

(71) Applicant: mui Lab, Inc., Kyoto (JP)

(72) Inventors: Takuya Kubota, Kyoto (JP); Kazunori Oki, Kyoto (JP); Takashi Sunohara, Kyoto (JP)

(73) Assignee: MUI LAB, INC., Kyoto (JP)

( * ) Notice: Subject to any disclaimer, the term of this patent is extended or adjusted under 35 U.S.C. 154(b) by 0 days.

(21) Appl. No.: 16/626,155

(22) PCT Filed: Mar. 8, 2018

(86) PCT No.: PCT/JP2018/009109
§ 371 (c)(1),
(2) Date: Dec. 23, 2019

(87) PCT Pub. No.: WO2019/171560
PCT Pub. Date: Sep. 12, 2019

(65) Prior Publication Data
US 2021/0295126 A1 Sep. 23, 2021

(51) Int. Cl.
*G06K 19/06* (2006.01)
(52) U.S. Cl.
CPC . *G06K 19/06075* (2013.01); *G06K 19/06037* (2013.01); *G06K 19/06112* (2013.01)
(58) Field of Classification Search
CPC ....... G06K 19/06075; G06K 19/06037; G06K 19/06112
See application file for complete search history.

(56) References Cited

U.S. PATENT DOCUMENTS

| 5,295,089 A | * | 3/1994 | Ambasz | .............. G06F 15/0216 361/679.09 |
|---|---|---|---|---|
| 2007/0024936 A1 | | 2/2007 | Suguro et al. | |
| 2015/0332137 A1 | | 11/2015 | Slavin et al. | |

FOREIGN PATENT DOCUMENTS

| JP | 1995-254037 A | 10/1995 |
|---|---|---|
| JP | 2006-099150 A | 4/2006 |
| JP | 2009-096380 A | 5/2009 |
| JP | 2015-118398 A | 6/2015 |
| JP | 6141567 B1 | 6/2017 |

OTHER PUBLICATIONS

International Search Report, PCT/JP2018/009109, dated May 1, 2018, 1 page.
"Supplementary European Search Report," dated Nov. 27, 2020, 4 pages.

* cited by examiner

*Primary Examiner* — Laura A Gudorf
(74) *Attorney, Agent, or Firm* — Ogilvie Law Firm

(57) ABSTRACT

Provided are a display method and a display device with which the display performance of a two-dimensional code can be improved in a display panel that can be used without damaging the texture of a space. When a display fault occurs in a display panel in which a thin layer, comprising a naturally-derived wood, a natural fiber, a natural leather, or a natural stone, or comprising a synthetic fiber, a synthetic leather, or a synthetic stone that is a raw material produced by imitating a natural appearance and feel, is provided on the peripheral surface of a housing so as to be in contact with the panel front surface, a two-dimensional code is corrected by being moved or rotated and is displayed.

15 Claims, 12 Drawing Sheets

(1)

(2)

(1)

(2)

DISPLAY METHOD AND DISPLAY DEVICE FOR TWO-DIMENSIONAL CODE

TECHNICAL FIELD

The present invention relates to a display method and a display device for displaying a two-dimensional code on a light emitting element matrix composed of a thin layer made of a natural material or the like incorporated on the outer peripheral surface of a casing.

BACKGROUND ART

In recent years, two-dimensional codes such as the QR code are often used. (for example, refer to Patent literature 1) For example, when a product is advertised, there is a way of using such codes by printing the two-dimensional code on a paper medium such as a newspaper or a magazine in order to direct a reader to an Internet site that introduces the product, to be read by a portable terminal owned by the reader.

As a display medium for the two-dimensional code, not only a print medium such as paper but also a display such as a personal computer display can be used. The method such as making the camera provided on a mobile phone and so on read out the two-dimensional codes displayed on the display device is widely used.

As described above, since the two-dimensional code is used diversely in many kinds of fields, there is a case where display on a paper medium or a liquid crystal display is not suitable depending on the use scene.

For example, if a two-dimensional code is displayed beside an exhibit in an art museum, visitors can be easily guided to a website that contains more detailed information on the exhibit. As a result, visitors can not only appreciate the work itself but also become connected to the information about the author and the story behind the work, and resultantly enjoy the work even more.

Therefore, it is conceivable to print a two-dimensional code on a paper medium and paste it on the side of each work.

However, in this method, in order to update the display content, there is a problem that the paper medium has to be pasted again, which is complicated and troublesome.

Whereas, if a method of displaying a two-dimensional code on a display by installing a liquid crystal display or the like near the work is adopted, the display content can be easily updated. However, when displaying the display content on a liquid crystal display, it is necessary to ensure a certain level of brightness for reading. At the same time, the lighting method and its level in the museum vary depending on the contents of the exhibition, which could result in insufficient brightness when the atmosphere of the display site is considered. In general, a liquid crystal display has an inorganic and mechanical configuration, which does not necessarily fit in the atmosphere of the exhibition place.

Therefore, unlike a liquid crystal display or the like, if the surface of the display device is made of a natural material such as wood, it can be said that it is easy to be fit in with the atmosphere of the place and not to hinder the appreciation of artworks and such. However, there are many material variations in naturally-derived materials, such as woody textures, in case of wood, for example, which tends to make the two dimensional code unclear or inaccurate, resulting in reading errors to easily occur.

Also, not only the two-dimensional code but also the display of characters may become unclear in a display device using a naturally-derived material on the surface.

PRIOR ART

Patent Literature

[Patent literature 1] JP 1995-254037 A

OUTLINE OF THE INVENTION

Problems to be Solved by the Invention

In view of such a situation, an object of the present invention is to provide a display method and a display device capable of improving the display performance of a two-dimensional code in a display panel that can be used without damaging the texture of a space.

Means to Solve the Objects

In order to solve the problems mentioned above, the display method for two-dimensional code of the present invention is a display method of a display panel with a thin layer consisting of a thin layer made of a naturally derived wood, a natural fiber, a natural leather or a natural stone, or a synthetic fiber, a synthetic leather or a synthetic stone that are generated for imitating the natural appearance and touch, being established at the peripheral surface of the casing, further, in case a display failure occurs, the two dimensional code is moved or rotated to correct the display.

By using a natural material or the like, it is possible to display a two-dimensional code in harmony with the space of the place and without damaging the atmosphere, and further turn off the light, when the display is not necessary. In addition, when a display failure occurs, display performance can be improved by correcting the two dimensional code with its displacement or rotation.

Here, the two-dimensional code is a code having information in the horizontal direction and the vertical direction. A QR code (registered trademark) is suitable as an example of the two-dimensional code.

As a method for updating the two-dimensional code to be displayed, a method such as a method in which the display device communicates with the outside or writes by short-range wireless communication (NFC: Near Field Communication) is conceivable.

In the display method for two-dimensional code according to the first viewpoint, the display failure is a display blur due to variations in the material constituting the thin layer, and a correction is performed by the following steps.
1) a step of displaying a two-dimensional code on the display unit of the display panel (display step);
2) a step of detecting display blur (detection step);
3) a step of adjusting the display by moving or rotating the two-dimensional code (adjustment step).

Material dispersion includes wood grain, fiber thickness, leather thickness, and the like.

Regarding correction, two-dimensional codes generally have an error correction capability. For example, the error correction capability in the case of a QR code is about 7 to 30%. When the error correction capability is increased, there is a problem that the data size increases, accordingly. The step of detecting blur of display is performed when there is a display error that exceeds the range of the error correction capability described above.

In the display step, as a method of displaying the two-dimensional code, the following methods are listed, for example, a method of touching the display unit, a method of data transmission from the outside, a method of operating a switch provided on the operation display panel built-in article, or a method of using an external infrared sensor or the like.

In the detection step, the success or failure of reading is judged by the user himself, for example, and when a reading error occurs, a method of operating a switch provided on the operation display panel built-in article is used.

The adjustment step is performed when the error correction capability is exceeded and thus the reading is not completed, and the display is performed by moving or rotating the display position of the two-dimensional code. The movement and rotation can be performed not only once but a plurality of times, and the movement and the rotation are not limited to either one of them, and both may be performed together. The reason why the rotation is performed for correction is that, for example, in the case of a QR code, three cutout symbols are provided so that the QR code can be read even if it is displayed in a rotated manner.

Further, as for the success or failure of reading in the adjustment step, similarly in the case of the detection step, for example, when the user himself or herself makes a judgement and the judgement results in a reading error, a method of operating a switch provided on the operation display panel built-in article is used.

It should be noted that the light may be automatically turned off with a certain period of time lapse after the correction. As a result, it becomes possible to minimize the deterioration of the atmosphere of the place where the display is performed. In that case, as a light-off method, a method of operating a switch provided in the display device, an external infrared sensor, or the like may be used as a trigger in addition to a method of automatically turning off the light according to a certain length of an elapsed time.

In the display method for two-dimensional code of the second aspect, the display failure is a failure of a light emitting element provided in the display panel, and the correction is performed by the following steps.
A) a step of monitoring a defect of the light emitting element (monitoring step),
B) a step of detecting a defect of the light emitting element upon receiving a display request (detection step),
C) a step of adjusting the display by moving or rotating the two-dimensional code (adjustment step),
D) a step of displaying the two-dimensional code on the display unit of the display panel (display step).

Defects of the light emitting element include a broken light bulb of an LED light source used for a display panel.

In the monitoring step, the monitoring may be constantly performed while the display panel is activated, but monitoring may be started by using a user operation or the user detection by the sensor as a trigger.

Since the display error becomes a problem when the error correction capability of the two-dimensional code is exceeded, the detection step detects a defect of light emitting element only when it is determined that the error correction capability has been exceeded after receiving a display request.

Detection of a defect of the light emitting element in the detection step and adjustment of display by moving or rotating the two-dimensional code are performed inside the apparatus provided with the display panel, not by a user operation or the like.

When a plurality of elements is in a defective state, the display position is adjusted so as not to exceed the error correction capability of the two-dimensional code to be displayed from the respective coordinates and the coordinates that require light emission.

The display request may be based on a user operation, or may be performed automatically by detecting a user with an infrared sensor or the like, for example.

In the display method for two-dimensional code according to the third aspect, the display failure is at least one of display blur due to variations in materials constituting the thin layer and a failure of a light emitting element provided in the display panel and the correction is performed by the following steps.
a) a step of monitoring a defect of the light emitting element (monitoring step);
b) a step of receiving a display request and detecting a defect of the light emitting element (light emitting element defect detecting step);
c) a step of a first adjustment for adjusting the display by moving or rotating the two-dimensional code;
d) a step of displaying the two-dimensional code on the display unit of the display panel (display step);
e) a step of detecting display blur (display blur detection step);
f) a step of a second adjustment for adjusting the display by moving or rotating the two-dimensional code.

According to the above mentioned display method, the display failure can be corrected regardless of whether the display defect is caused by an unclear display due to variation in the material constituting the thin layer or a defect of the light emitting element provided in the display panel, enabling display performance improvement.

The display method for two-dimensional code according to the third aspect uses both the display method for two-dimensional code according to the first aspect and the two-dimensional code display method according to the second aspect. Alternatively, the two-dimensional code display method according to the first aspect may be used after the two-dimensional code display method according to the second aspect.

In the display method for two-dimensional code of the present invention, in order to perform the movement of the two-dimensional code, it is preferable to provide a movement enabling area of 40% to 60% each against the height or width of the two-dimensional code at least either on the top and bottom, or on the left and right.

Depending on the type of the two-dimensional code, it is essential that a predetermined blank area is provided. Therefore, the height or width of the two-dimensional code here is the height or width of the entire two-dimensional code including the blank area when a blank area is provided, and when the blank area is not provided, the height or width of a two-dimensional code is meant to be without a blank area.

The display device for two-dimensional code of the present invention is equipped with a display means for compensating by moving or rotating the two-dimensional code when a display failure occurs, in the display panel with a thin layer of a naturally derived wood, a natural fiber, natural leather, a natural stone, or a synthetic fiber, a synthetic leather or a synthetic stone that is generated for imitating the natural appearance and touch is arranged at the outer surface of a casing to abut on the front surface of the panel.

The display device for two-dimensional code of the present invention may be provided with a means for updating the two-dimensional code to be displayed by communication of the display device with the outside, by writing using a short-range wireless communication and such.

In the display device for two-dimensional code according to the first viewpoint, the display failure is display blur due to variations in a material constituting the thin layer and the correction means constitutes of a means to display a two-dimensional code at the display part of the display panel, a means to detect the blur of the display and a means to adjust the display by moving or rotating the two-dimensional code.

In the display device for two-dimensional code according to the second viewpoint, the display failure is a failure of the light emitting element provided in the display panel, and the correction means includes a means for monitoring the failure of the light emitting element, a means for detecting a defect of the light emitting element on receiving the display demand, a means for adjusting the display by moving or rotating the two-dimensional code, and a means for displaying the two-dimensional code on the display unit of the display panel.

In the display device for two-dimensional code according to the third viewpoint, the display failure is at least one of display blur due to variations in materials constituting the thin layer or a failure in a light emitting element provided in the display panel and the correction means constitutes a means for monitoring a defect of the light emitting element, a means for detecting the defect of the light emitting element in response to the display request, the first adjustment means for adjusting the display by moving or rotating the two-dimensional code, a means for displaying the two-dimensional at the display part of the display panel, a means for detecting uncleanness of the display and the second adjustment means for adjusting the display by moving or rotating the two-dimensional code.

The display device for two-dimensional code according to the present invention preferably is provided with a movement enabling area of 40~60% of each height or width of the two-dimensional code on at least one of the top and bottom or the left and right of the display part.

Effects of the Invention

According to the display method and display device for two-dimensional code of the present invention, since a naturally-derived material or the like is used on the surface, there is an effect that it can be used without damaging the texture of a space by being melted into the space. In addition, since display defects can be corrected, there is an effect that display performance can be improved.

BEST MODE FOR CARRYING OUT THE INVENTION

Embodiments of the present invention will be described in detail below with reference to the drawings. The present invention is not limited to the following embodiment and examples of shown in the figure, and the present invention can be variously changed in design.

Embodiment 1

(About the Structure of Operation Display Panel Built-In Article)

Figure 1:
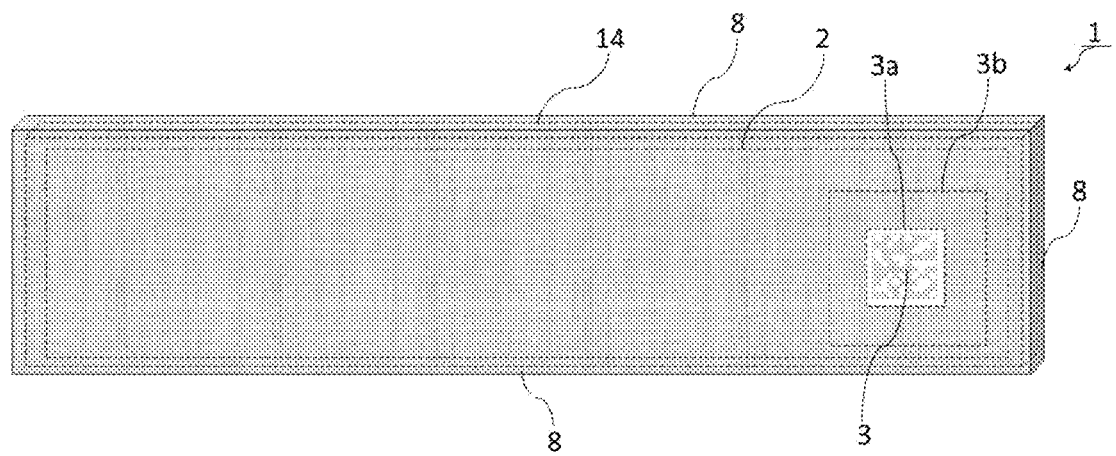
FIG. 1 shows an external view of an operation display panel built-in article equipped with the display device of the Embodiment 1.

FIG. 1 shows an external view of an operation display panel built-in article equipped with the display device of the Embodiment 1. As shown in FIG. 1, the operation display panel built-in article 1 is covered with the wood veneer 8 in a front view, and thus has a shape as if it is a single wooden board. An operation display panel unit 14 is provided inside the operation display panel built-in article 1.

The display unit 2 displays information necessary for the user (not shown) such as characters and graphics. A two-dimensional code display area 3a is provided in the display unit 2, and the two-dimensional code 3 is displayed in the two-dimensional code display area 3a. The two-dimensional code display area 3a is not fixed substantially to the right end in the display unit 2, and can be set at a free position within the display unit 2 depending on the utilization mode. Therefore, for example, as long as the two-dimensional code 3 is displayed by the user touching an arbitrary part of the display unit 2, the two-dimensional code 3 may be displayed at the part touched by the user.

Figure 2:
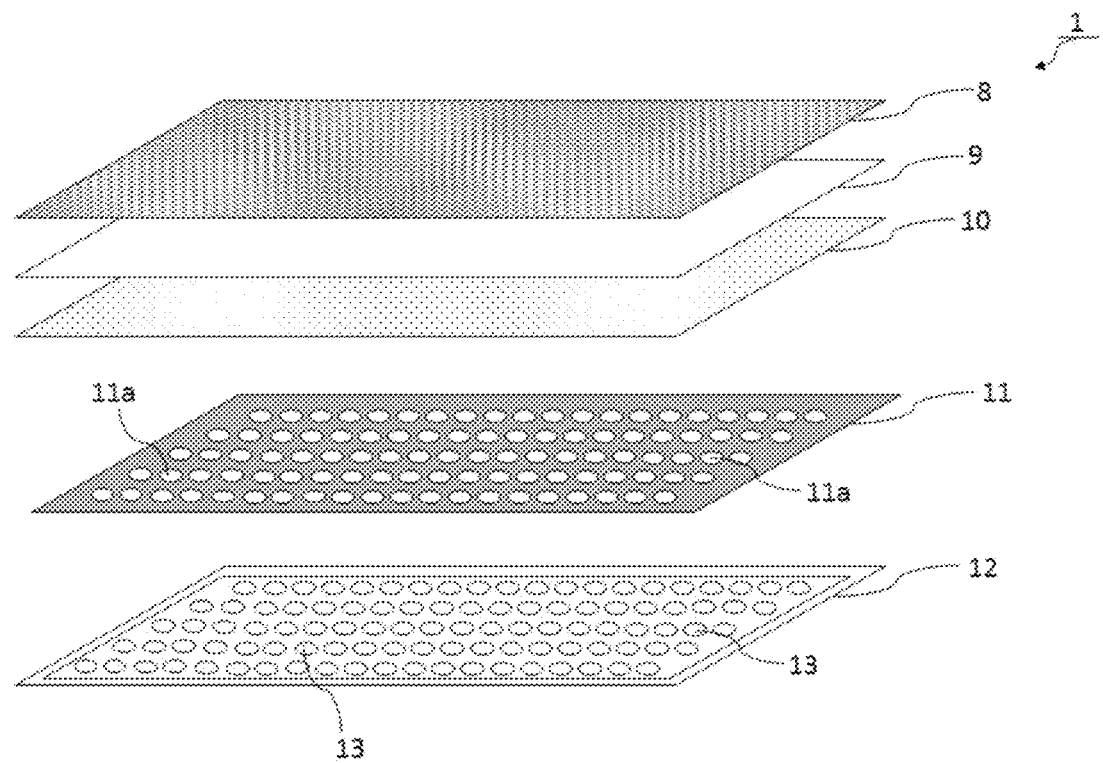
FIG. 2 shows a configuration image diagram of an operation display panel built-in article equipped with the display device of the Embodiment 1.

Next, the internal structure of the operation display panel built-in article will be described. FIG. 2 shows a configuration image diagram of an operation display panel built-in article equipped with the display device of the Embodiment 1. As shown in FIG. 2, the operation display panel built-in article 1 is configured with a wood veneer 8, a transparent base material 9, a touch panel sheet 10 as a transparent conductive film, a light guide 11 and an LED array 12 as a light emitting element array, each being stacked successively from the top.

The wood veneer 8 is located on the outer surface of the operation display panel built-in article 1, and the LED array 12 is configured to be located inside the article. As the material of the wood veneer 8, a Sycamore material having a high transmittance of about 10% and a good appearance is used.

In the LED array 12, a large number of LED light sources 13 are two-dimensionally arranged. The light guide 11 guides the light emission direction of each LED light source 13 in a direction perpendicular to the substrate of the LED array 12, and is provided with the guide holes 11 of the same number as the number of LED light sources 13.

In FIG. 2, for convenience of explanation, not all LED light sources are shown, but for example, the LED array 12 is composed of a total of 6400 LED light sources 13, consisting of 32 light sources vertically and 200 light sources horizontally. One LED light source is composed of a planar mounting type LED. A point light source is realized by the light of one LED light source, and this is regarded as one dot, and one character or design can be expressed by 8×8 dots or 16×16 dots. For example, in the case of the LED array 12 having 6400 LED light sources, a sentence of 22 characters×3 lines can be expressed. Here, the LED light source 13 has a size of 2 mm×2 mm and has a size of 700 to 1000 mcd (milli-candela), for example. A two-dimensional code is displayed using such an LED array 12.

The light guide 11 plays a role of making characters or patterns constituted by light emitted from the LED light source 13 clearly visible through the wood veneer 8. Namely, when the light guides 11 are stacked on the LED array 12, a large number of guide holes 11a are arranged in accordance with the arrangement of the LED light sources 13 so that the guide holes 11a are arranged immediately above each LED light source 13.

Figure 3:
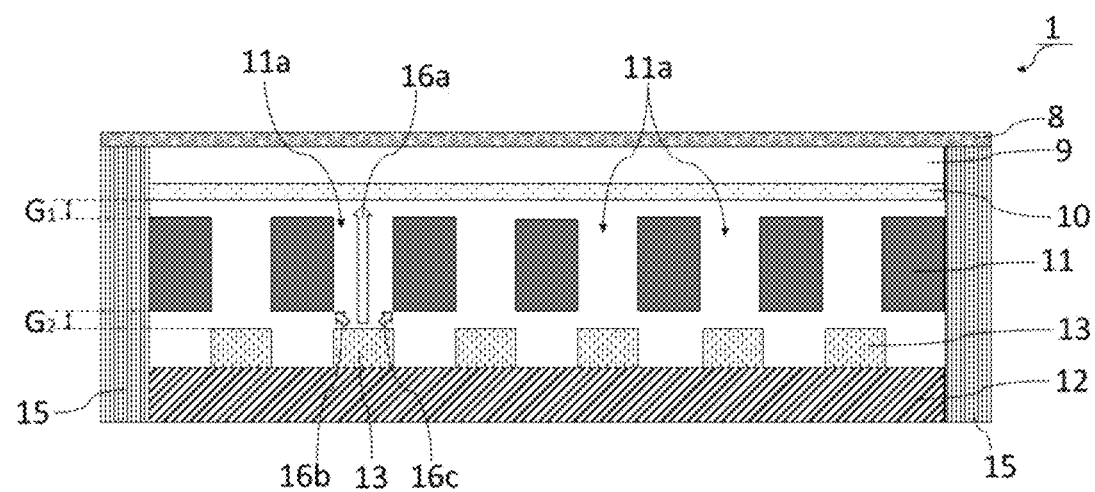
FIG. 3 is a schematic cross-sectional view of an operation display panel built-in article on which the display device of the Embodiment 1 is mounted.

Next, the structure after the assembling of the operation display panel built-in article will be described with reference to FIG. 3. FIG. 3 is a schematic cross-sectional view of an operation display panel built-in article on which the display device of the Embodiment 1 is mounted. As shown in FIG. 3, in the operation display panel built-in article 1, the wood veneer 8, the transparent base material 9, the touch panel sheet 10, the light guide 11, and the LED array 12 are adhered by the housing 15 in a stacked state in order from the top. Of the light emitted from the LED light source 13 provided on the LED array 12, the light (16b, 16c) emitted obliquely is blocked by the light guide 11, and is projected as a straight light like the light 16a on the wood veneer 8. Note that the casing 15 is mainly constituted of ABS resin.

The wood veneer 8 and the transparent substrate 9 or the transparent substrate 9 and the touch panel sheet 10 are bonded together without providing a gap. On the other hand, a gap G1 is provided between the touch panel sheet 10 and the light guide 11. This is because the light guide 11 is provided with a guide hole 11a, and if the touch panel sheet 10 and the light guide 11 are bonded, a stress dispersion occurs when the touch panel is operated, which becomes a cause of malfunction.

Also, a gap G2 is provided between the light guide 11 and the LED light source 13. Since the number of the LED light sources 13 provided in the LED array 12 and the guide holes 11a provided in the light guide 11 reaches as many as several thousands, when the light guide 11 and the LED array 12 are stacked, there is a possibility that an arrangement error occurs. If the light guide 11 and the LED array 12 are bonded in a state where an error has occurred, the light emitted from the LED light source 13 does not pass through the guide hole 11a and an accurate display is not resultantly performed. Therefore, by providing the gap G2, it is possible to prevent deterioration in display quality due to an error in the arrangement of the LED light source 13 and the guide holes 11a. In addition, since the display quality is maintained even if there are some errors, the manufacturing becomes easy, accordingly.

(About a Display Method of a Two-Dimensional Code)

The two-dimensional code 3 shown in FIG. 1 is, for example, a QR code, and is composed of two types of cells having different colors, densities, or brightness. When the two-dimensional code 3 is a QR code, a blank area for four cells, three cut-out symbols, etc. are provided around the two-dimensional code, which is omitted in explaining the QR code below for convenience sake. Also, the number of display cells differs from the actual one, and will be described in a simplified manner as shown below. The configuration of the display area, the movable area, and the display cell of the two-dimensional code in this embodiment will be described with reference to FIG. 4.

Figure 4:
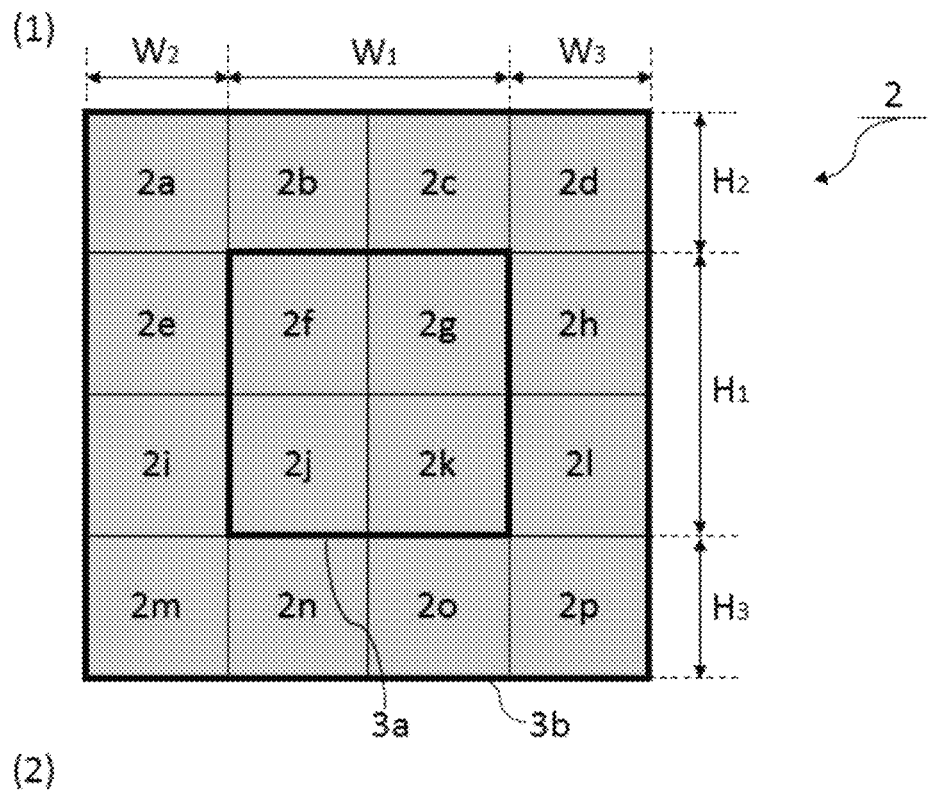
FIG. 4 is an explanatory diagram of the two-dimensional code display area and the movable area.
Figure 4:
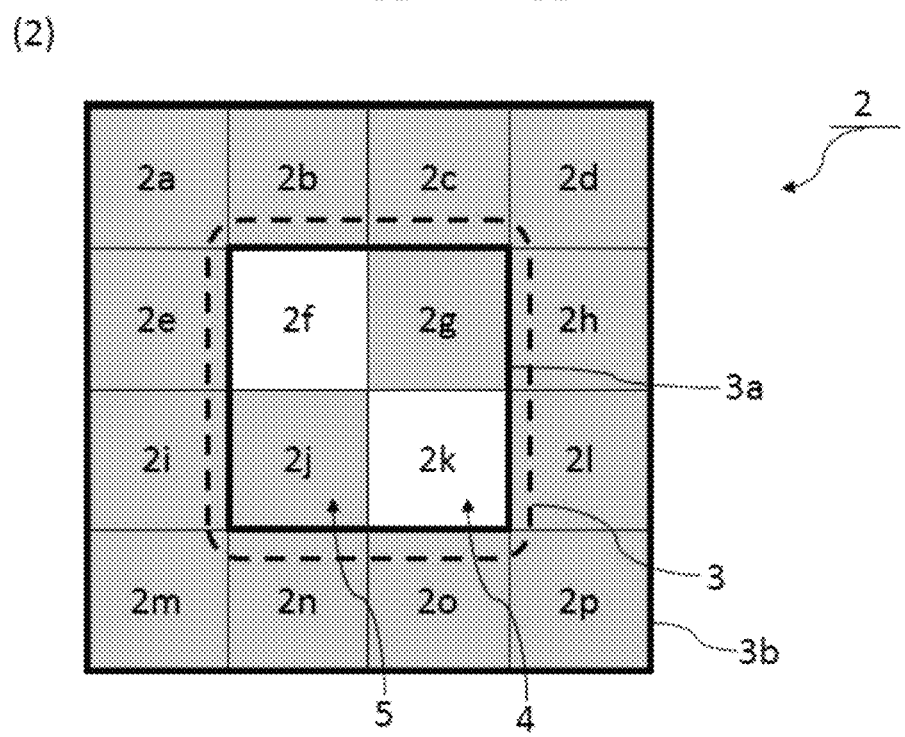

FIG. 4 is an explanatory diagram of the two-dimensional code display area and the movable area. As shown in FIG. 4, the display unit 2 is provided with display cells (2a~2p).

The two-dimensional code display area 3a is composed of vertical 2× horizontal 2, and is set in the range of display cells (2f, 2g, 2j, 2k) here. Around the two-dimensional code display area 3a, a movable area 3b is provided in about 50% of the height or width of the two-dimensional code display area 3a in any of the upper, lower, left and right directions. Specifically, a movable area 3b corresponding to the display cells (2a~2d) is formed on the two-dimensional code display area 3a at a height H2 of about 50% of the height H1 of the two-dimensional code display area 3a. and a movable area 3b corresponding to the display cell (2m~2p) is provided below the two-dimensional code display area 3a at a height H3 of about 50% of the height H1 below the two-dimensional code display area 3a.

Further, a movable area 3b corresponding to the display cell (2a, 2e, 2i, 2m) is provided on the left side of the two-dimensional code display area 3a with a width W2 of about 50% of the width W1 of the two-dimensional code display area 3a and the movable area 3b corresponding to the display cell (2d, 2h, 2l, 2p) is provided on the right side of the two-dimensional code display area 3a with a width W3 of about 50% of the width W1 of the two-dimensional code display area 3a.

It is assumed that each of the display cells (2a~2p) is provided with a light emitting element, that is to say, an LED light source 13. Accordingly, the display cells (2a~2p) are either in the light emitting state 4 as shown in white or the non-light emitting state 5 as shown in gray depending on the two-dimensional code to be displayed. In the two-dimensional code 3 shown in FIG. 4 (2), the display cell (2f, 2k) is in the light emitting state 4, and the display cell (2g, 2j) is in the non-light emitting state 5. For example, in the QR code, the display cell (2f, 2k) in the light emission state 4 is recognized as white, and the display cell (2g, 2j) in the non-light emission state 5 is recognized as black.

Note that the configurations of the two-dimensional code display area and the movable area shown in FIG. 4 is similar to that of the Embodiment 2 to be described later.

In this Embodiment, a display method for avoiding a display error due to the overlapping of the wood grain 6 of the wood veneer 8 with the light from the LEC light source 13 is described.

Figure 5:
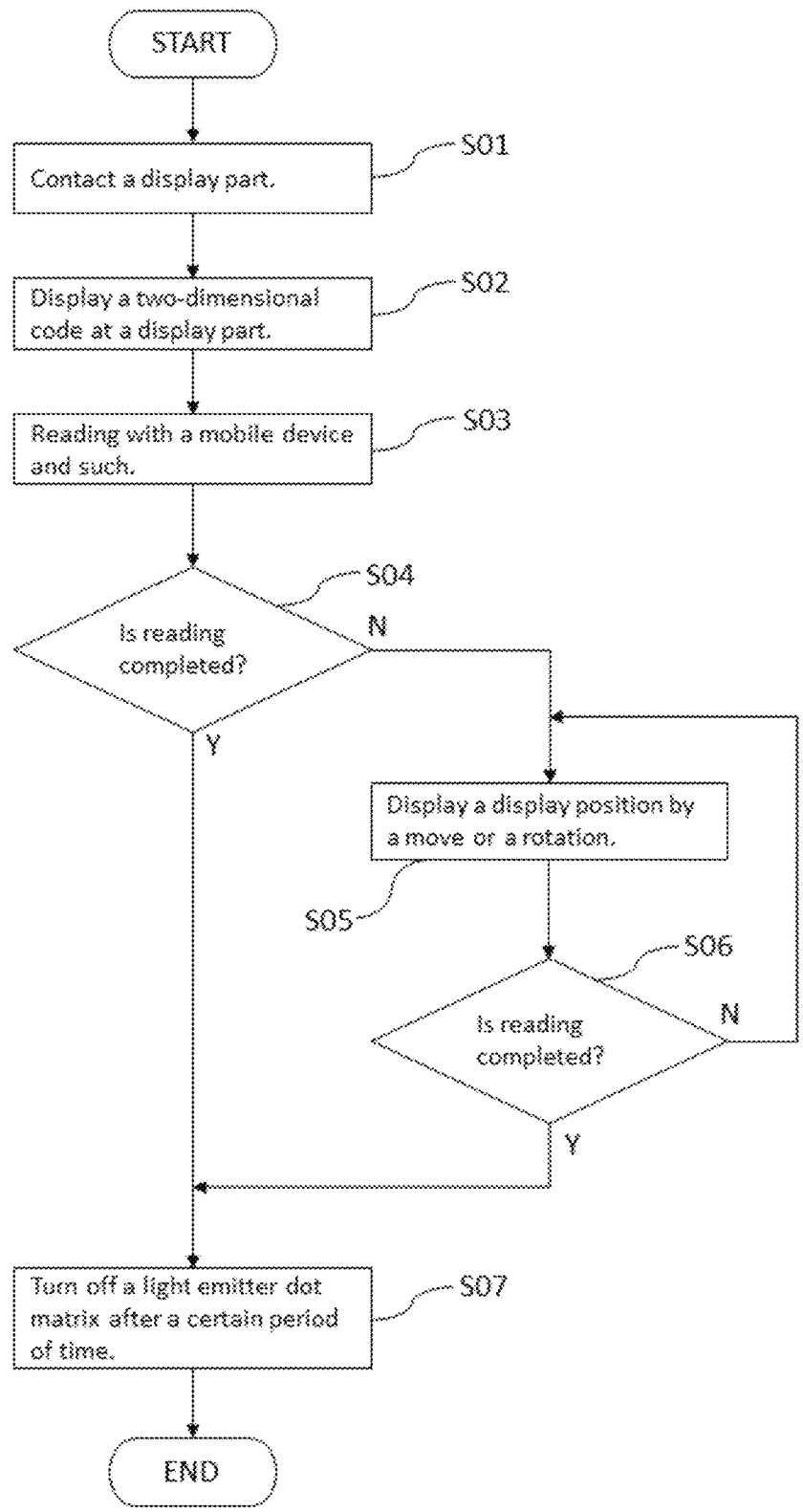
FIG. 5 shows a flowchart of the display method of the Embodiment 1.

FIG. 5 shows a flowchart of the display method of the Embodiment 1. First of all, as shown in FIG. 5, a user contacts the display unit 2 (step S01) and the two-dimensional code 3 is displayed on the display unit 2 (step S02). As a method of displaying the two-dimensional code 3, besides the method of contacting the display unit 2, a method of transmitting data from the outside, a method of operating a switch provided in the operation display panel built-in article 1, or a method therein an external infrared sensor or the like may be used.

The user reads the displayed two-dimensional code 3 using a mobile phone with a camera or the like (not shown) (step S03). The success or failure of reading is judged by the user himself, and when a reading error occurs, a method of operating a switch provided on the operation display panel built-in article 1 is used. Even if a slight error occurs during reading, reading is possible as long as it is within the range of error correction capability. Including a case such as this, when reading is completed, the display is not changed, and the light emitting element dot matrix is turned off after a predetermined time has elapsed (step S07).

On the other hand, when the error correction capability is exceeded and reading is not completed, the display position of the two-dimensional code 3 is moved or rotated to execute display (step S05). Here, a method of moving or rotating the display position will be described with reference to FIG. 6~FIG. 8.

Figure 6:
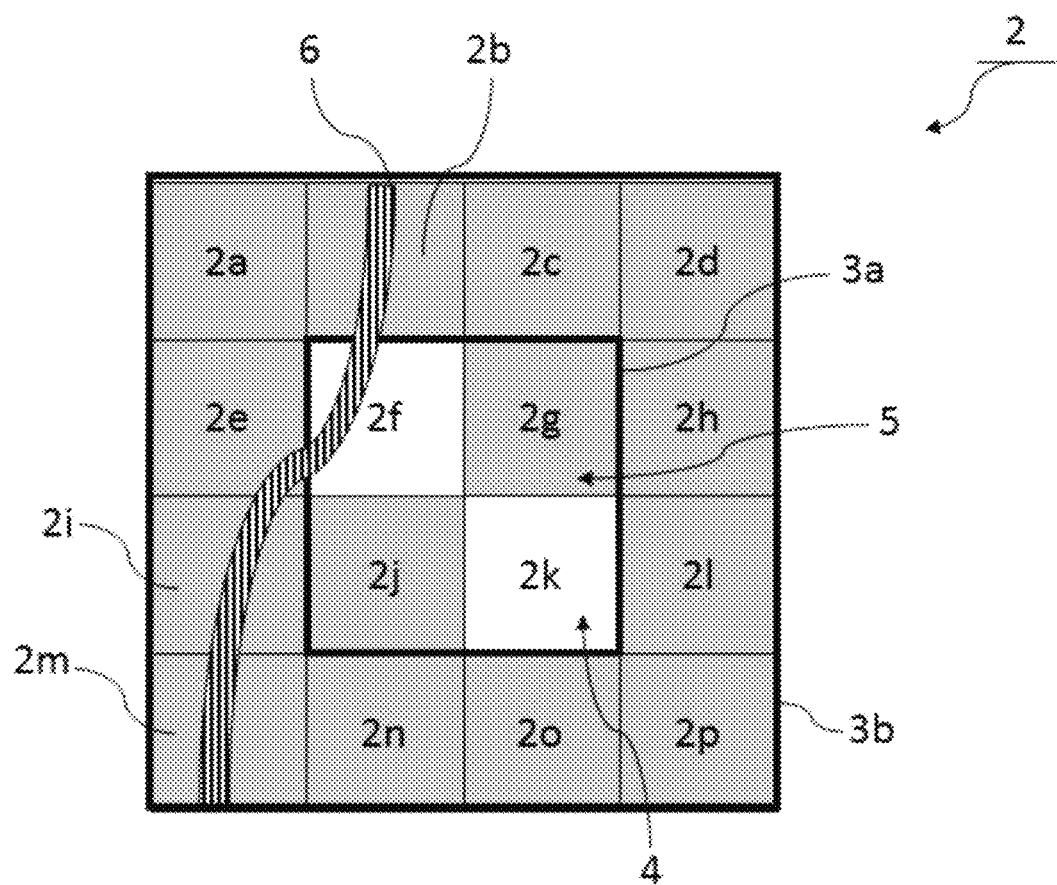
FIG. 6 shows a display image diagram of the two-dimensional code before using the display method of the Embodiment 1.

FIG. 6 shows a display image diagram of the two-dimensional code before using the display method of the Embodiment 1. As shown in FIG. 6, in the two-dimensional code display area 3a, the display cells (2f, 2k) are in the light emitting state 4, and the display cells (2g, 2j) are in the non-light emitting state 5. However, the grain 6 of the wood veneer 8 overlaps the display cell of the display unit 2. Even in such a case, it is possible to read the two-dimensional code 3 within the range of the error correction capability of the two-dimensional code. However, if the error correction capability of the two-dimensional code is exceeded, it becomes difficult to read the light emission state 4 of the display cell 2f with a user terminal or the like. Thus, the display is adjusted by movement or rotation in such cases.

Figure 7:
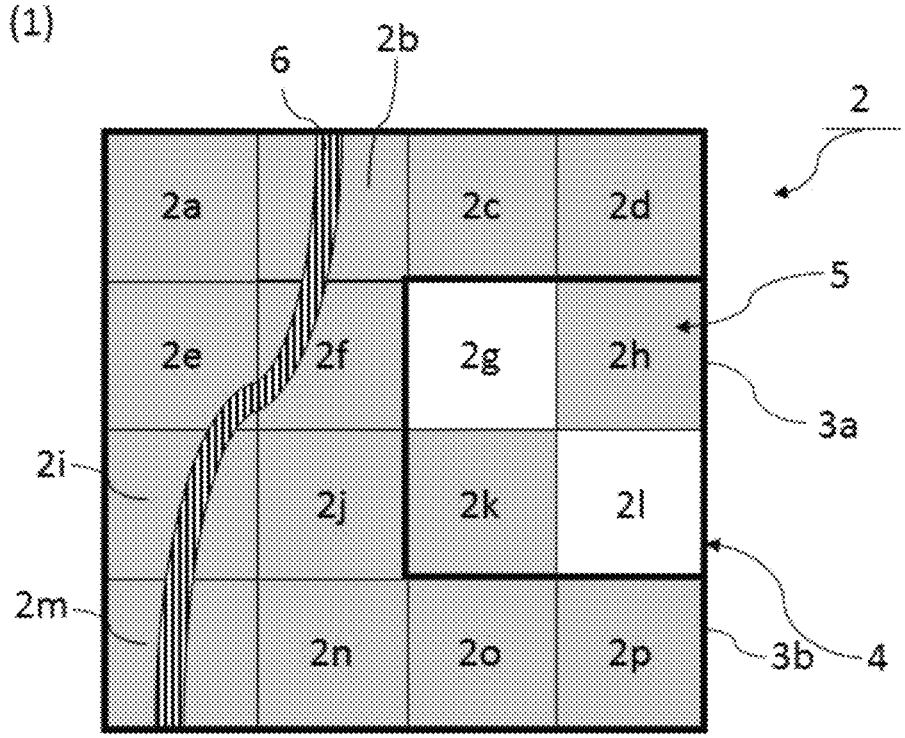
FIG. 7 shows a display image diagram (1) of the two-dimensional code before using the display method of the Embodiment 1.
Figure 7:
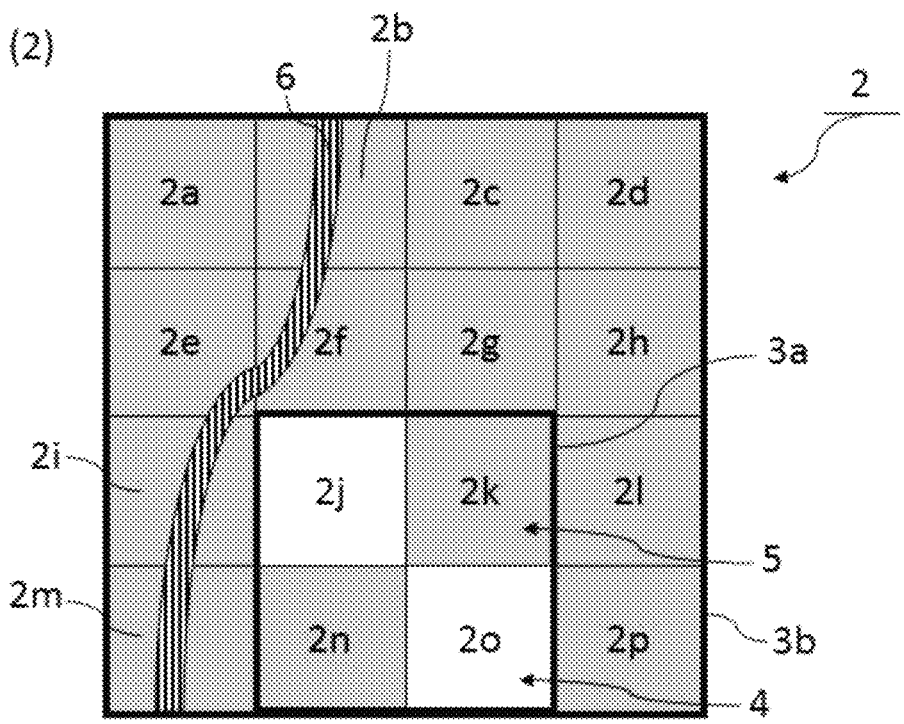
Figure 8:
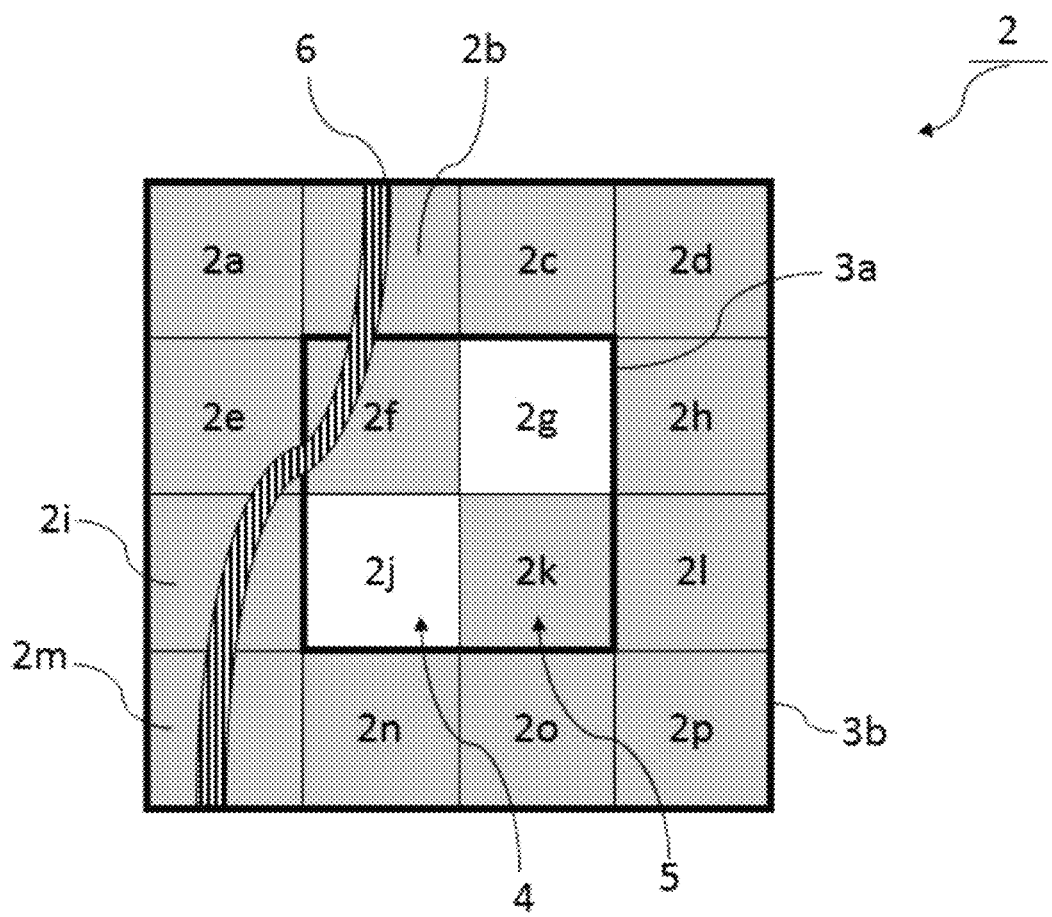
FIG. 8 shows a display image diagram (2) of the two-dimensional code before using the display method of the Embodiment 1.

FIG. 7 and FIG. 8 are two-dimensional code display image diagrams when the display method of the Embodiment 1 is used. FIG. 7 (1) shows a state wherein the two-dimensional code display area is moved rightward and FIG. 7 (2) shows a state wherein the two-dimensional code display area is moved downward. And FIG. 8 shows a state wherein the display area is rotated rightward by 90°.

As shown in FIG. 7 (1), the two-dimensional code display area 3a moves rightward from the range of the display cells (2f, 2g, 2j, 2k) to the range of the display cells (2g, 2h, 2k, 2l). As a result, the two-dimensional code display area 3a does not overlap with the grain 6, and the state wherein it is difficult to read the light emission state 4 of the display cell 2f is eliminated.

Further, as shown in FIG. 7 (2), the two-dimensional code display area 3a is moved downward from the range of the display cells (2f, 2g, 2j, 2k) to the range of the display cells (2j, 2k, 2n, 2o). As a result, the two-dimensional code display area 3a does not overlap with the grain 6, and the state wherein it is difficult to read the light emission state 4 of the display cell 2f is eliminated.

As has been described here, it is possible to make a readable state even when the display area is moved rightward or downward. With regard to the selection of the moving direction, an arbitrary method can be used, such as selecting a position in advance, but it is preferable that the moving direction is displayed at any position within the movable area 3b. This is because the reading accuracy improves with the increase of the number of display patterns.

Also, as shown in FIG. 8, the two-dimensional code display area 3a remains in the range of the display cells (2f, 2g, 2j, 2k) even in the state of being rotated to the rightward direction by 90°. However, since the cell 2f falls into the non-light emitting state 5, it does not overlap with the grain 6, and the state wherein it is difficult to read the light emitting state 4 of the display cell 2f is eliminated.

The rotation of the two-dimensional code 3 may be used together with the movement of the two-dimensional code 3. By changing and displaying the two-dimensional code 3 at any position and orientation within the movable area 3b, the display pattern is further increased and the reading accuracy is improved.

In a case wherein the reading is completed due to the movement or rotation of the display position of the two-dimensional code 3, the light emitting element dot matrix is turned off after the time lapse for a predetermined time. (step S07). By turning off the light after the certain time lapse, it is possible to minimize the loss of the atmosphere of the place where the display is performed.

In addition, regarding the turning off of the light, a method of operating a switch provided in the operation display panel built-in article 1 or an external infrared sensor may be used as a trigger in addition to a method of automatically turning off the light with the elapsed time.

Embodiment 2

In this embodiment, a display method for avoiding an error due to a bulb burnout of the LED light source 13 will be described.

Figure 9:
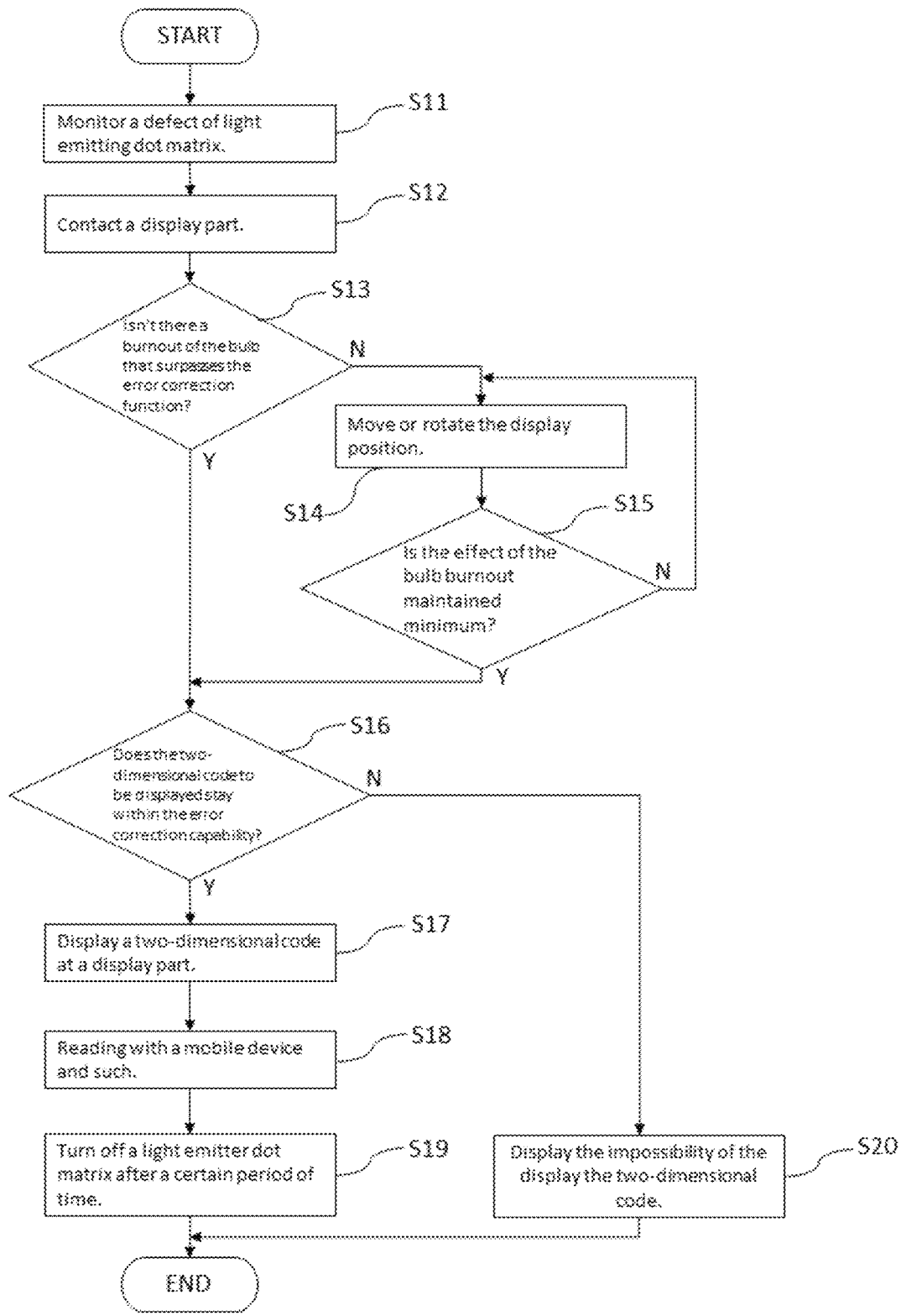
FIG. 9 shows a flowchart of the display method of the Embodiment 2.

FIG. 9 shows a flowchart of the display method of the Embodiment 2. As shown in FIG. 9, first of all, the defect of the light emitting element dot matrix is monitored by measuring the amount of current (step S11). In such a circumstance, the user contacts the display unit 2 (step S12). Even if the LED light source 13 is partially broken, reading is possible as long as it is within the range of error correction capability. If there is no bulb-burnout exceeding the error correction capability range (step S13), the displayed two-dimensional code can be said to be within the error correction capability range (step S16) and the two-dimensional code is displayed on the display unit (step S17), read by a portable terminal or the like (step S18) and the light emitting element dot matrix is turned off (step S19) after a predetermined time lapse.

On the other hand, when there is a bulb-burnout exceeding the range of the error correction capability (step S13), the display position is adjusted by moving or rotating the display position of the two-dimensional code 3 (step S14). Here, a method of moving or rotating the display position will be described with reference to FIG. 10~FIG. 12.

Figure 10:
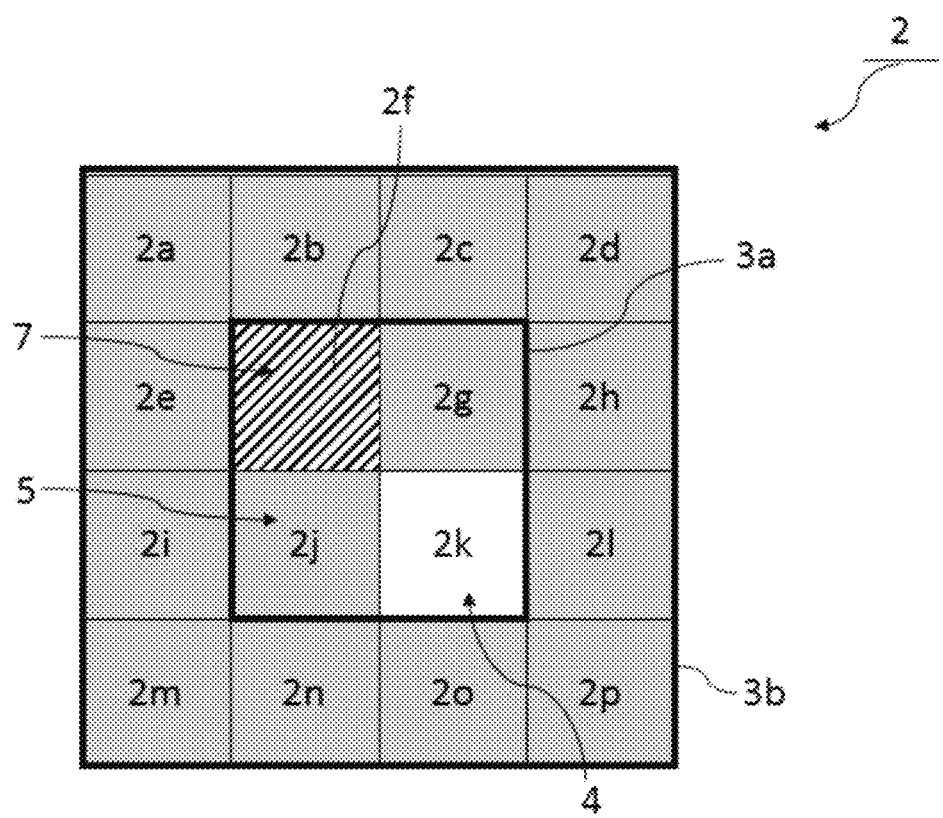
FIG. 10 shows a display image diagram of the two-dimensional code before usage of the display method in the Embodiment 2.

FIG. 10 shows a display image diagram of a two-dimensional code before usage of the display method in the Embodiment 2. As shown in FIG. 4 (2), primarily, in order to display the two-dimensional code 3 in the two-dimensional code display area 3a, the display cell (2f, 2k) needs to be in the light emitting state 4, and the display cell (2g, 2j) needs to be in the non-light emitting state 5. However, as shown in FIG. 10, the display cell 2f is in a bulb-burnout state 7 in the two-dimensional code display area 3 a. Therefore, the display cell 2f is substantially in the same state as the non-light emitting state 5. Even in such a case, it is possible to read the two-dimensional code 3 if the two-dimensional code 3 being in the range of the error correction capability of the two-dimensional code. However, if the error correction capability of the two-dimensional code is exceeded, it becomes difficult to read the light emission state 4 with a user terminal or the like. In such a case, the display is adjusted by moving or rotating of the code.

Figure 11:
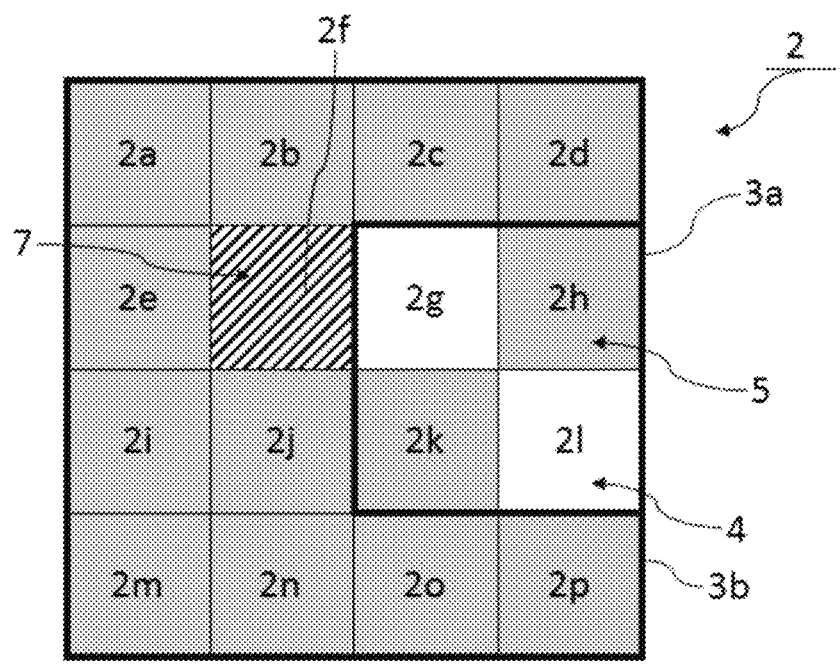
FIG. 11 shows a display image diagram (1) of the two-dimensional code before using the display method of the Embodiment 2.
Figure 11:
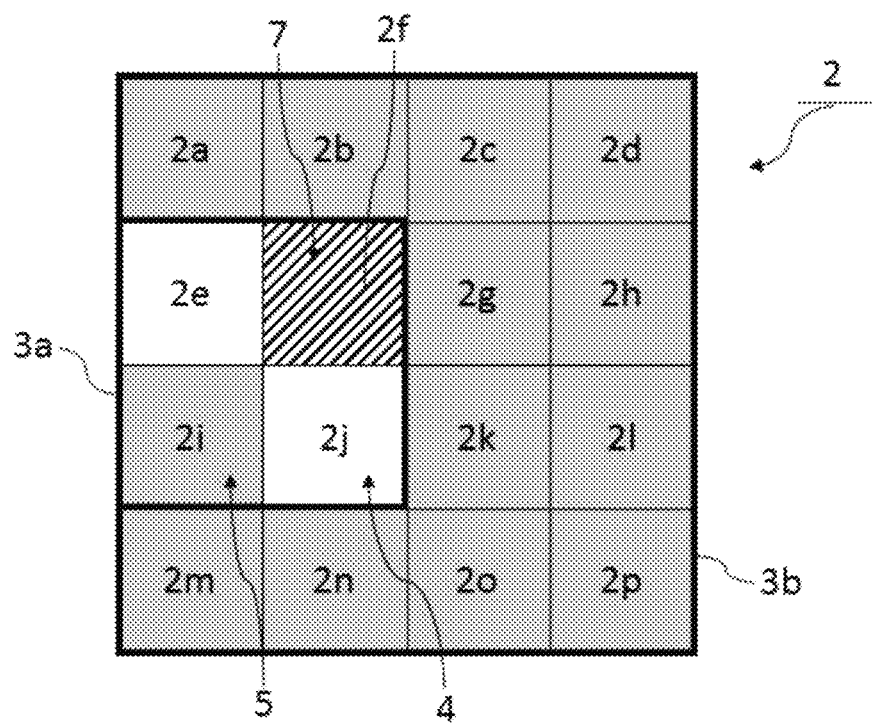
Figure 12:
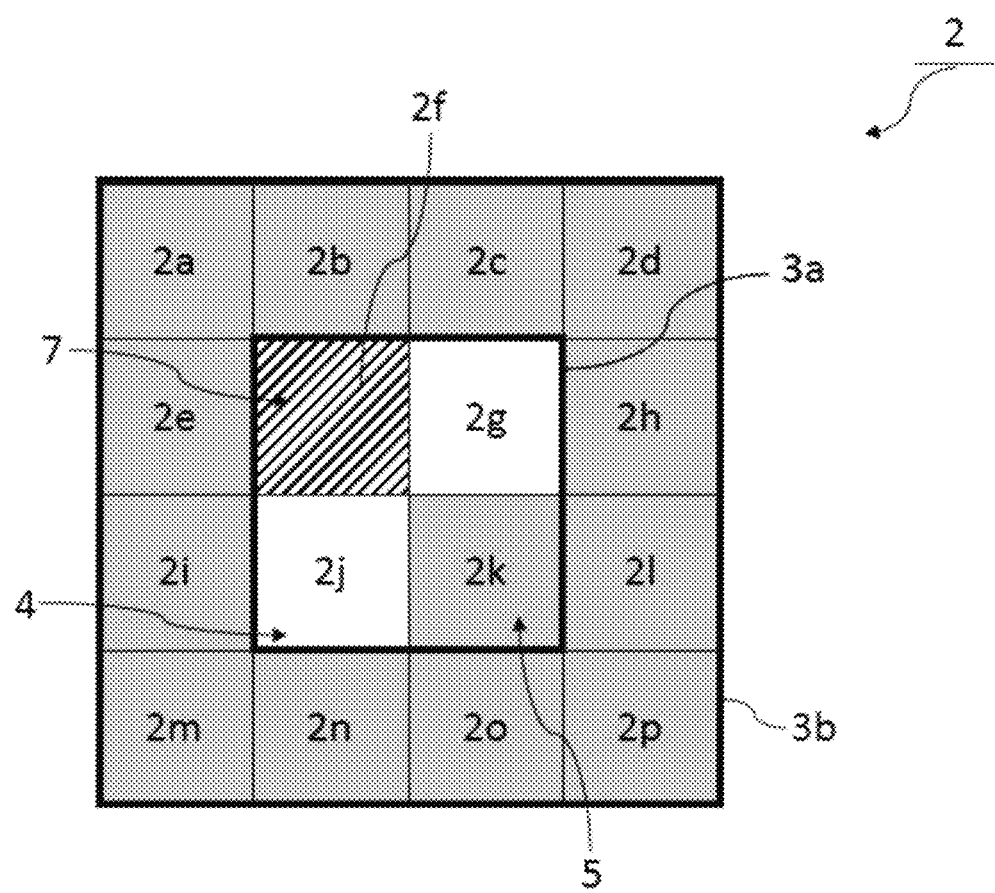
FIG. 12 shows a display image diagram (2) of the two-dimensional code before using the display method of the Embodiment 2.

FIGS. 11 and 12 are the code display image diagrams of the two-dimensional code when the display method of the Embodiment 2 is used. FIG. 11 (1) shows a state in which the two-dimensional code display area is moved rightward, and FIG. 11 (2) shows a state of the two-dimensional code being moved leftward. Also, FIG. 12 shows a state after being rotated 90° to the right.

As shown in FIG. 11 (1), the two-dimensional code display area 3a moves rightward from the range of the display cells (2f, 2g, 2j, 2k) to the range of the display cells (2g, 2h, 2k, 2l). As a result of this moving, the two-dimensional code display area 3a is out of the area of the display cell 2f that is in the bulb-burnout state 7, and the state in which reading of the light emission state 4 is difficult is resolved.

Further, as shown in FIG. 11 (2), the two-dimensional code display area 3a is moved leftward from the area of the display cell (2f, 2g, 2j, 2k) to the area of the display cell (2e, 2f, 2i, 2j). As a result, the display cell (2e, 2j) is in the light emitting state 4, the display cell 2i is in the non-light emitting state 5, and the display cell 2f is in the bulb-burnout state 7, which is substantially the same as the non-light emitting state 5 and the situation in which it is difficult to read out the light emitting state 4 has been resolved.

As has been described, it is possible to make it readable even if being moved in either the left or the right direction.

Also, as shown in FIG. 12, the two-dimensional code display area 3a remains in the range of the display cells (2f, 2g, 2j, 2k) even when being rotated to the right by 90°, however, the state in which reading of the light-emitting state 4 is difficult is eliminated because the display cell 2f becomes similar to the non-light-emitting state 5 even when the display cell 2f is in the bulb-burnout state 7.

Similarly to the Embodiment 1, the movement and rotation of the two-dimensional code 3 can be performed a plurality of times and may be used together. Reading accuracy improves due to the increase of the display patterns by changing and displaying the two-dimensional code 3 in every position and direction within the movable area 3b.

By moving or rotating the display position of the two-dimensional code 3, it is possible to minimize the influence of the bulb-burnout (step S15), and when the two-dimensional code to be displayed is within the error correction capability range (step S16), the two-dimensional code 3 is displayed on the display unit 2 (step S17), read by a portable terminal or the like (step S18), and the light emitting element dot matrix is turned off after a predetermined time lapse (step S19).

On the other hand, when the two-dimensional code to be displayed exceeds the range of the error correction capability (step S16), the impossibility of the two-dimensional code display is displayed (step S20).

Embodiment 3

In this embodiment, a display method for avoiding a display error due to the overlapping of the grain 6 of the wood veneer 8 and the light from the LED light source 13, and a display method for avoiding an error due to a broken bulb of the LED light source 13 are combined.

Figure 13:
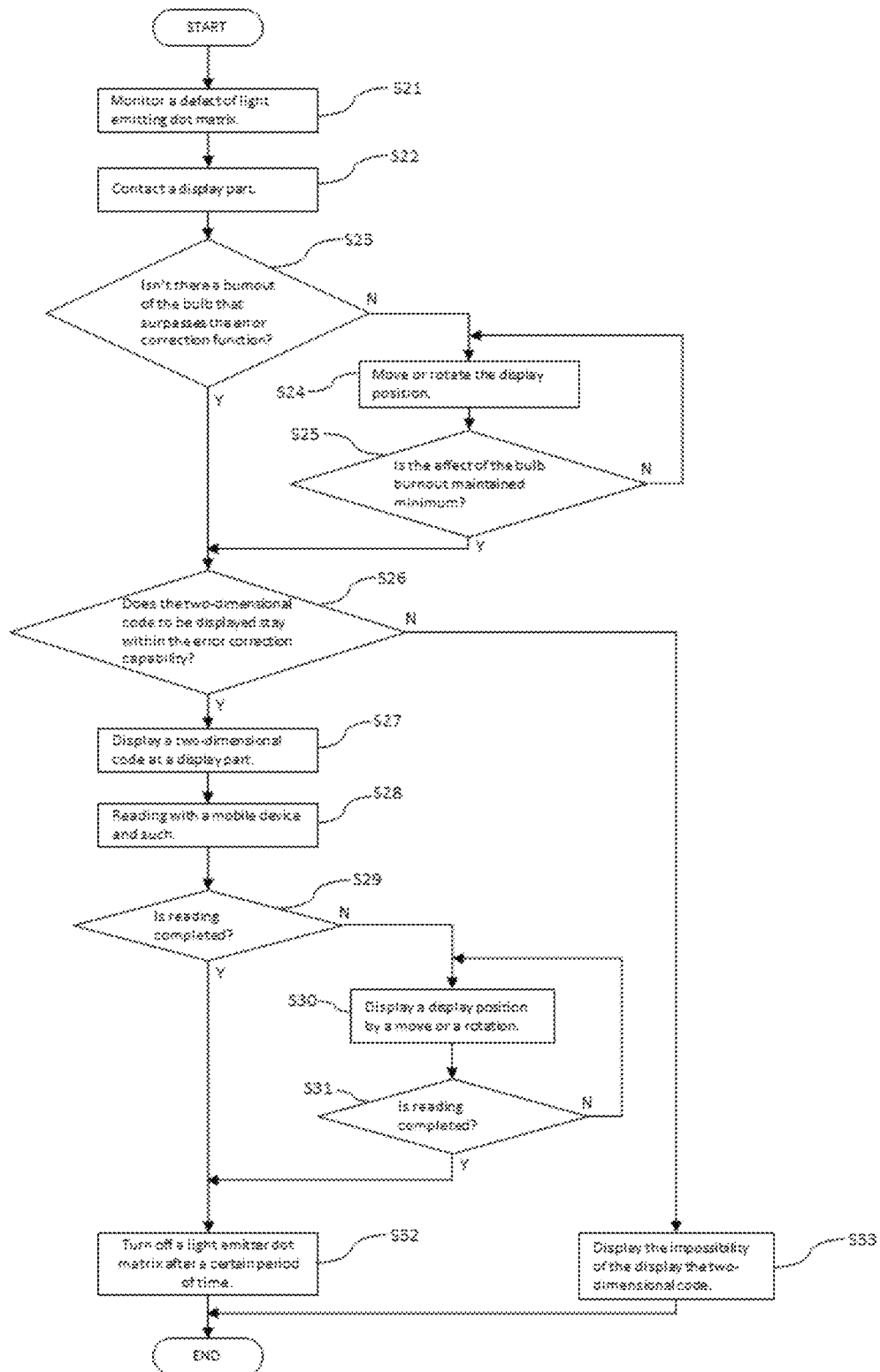
FIG. 13 shows a flowchart of the display method according to the Embodiment 3.

FIG. 13 shows a flowchart of the display method according to the Embodiment 3. Firstly, as shown in FIG. 13, the defect of the light emitting element dot matrix is monitored by measuring the amount of current (step S21). In such a state, a user contacts the display unit 2 (step S22). If there is no bulb-burnout exceeding the range of error correction capability (step S23), it can be said that the two-dimensional code to be displayed is within the range of error correction capability (step S26), so the two-dimensional code is displayed on the display unit (step S27) and read by a portable terminal or the like (step S28).

Whereas, if there is a bulb-burnout exceeding the range of the error correction capability (step S23), the display position is adjusted by moving or rotating the display position of the two-dimensional code 3 (step S24). By moving or rotating the display position of the two-dimensional code 3, it is possible to minimize the influence of the bulb-burnout (step S25), and when the two-dimensional code to be displayed is within the error correction capability range (step S26), the two-dimensional code 3 is displayed on the display unit 2 (step S27), and is read by a portable terminal or the like (step S28).

In contrast to the above, when the two-dimensional code to be displayed exceeds the range of the error correction capability (step S26), it is displayed on the display unit 2 that the two-dimensional code cannot be displayed (step S33).

When reading is performed with a portable terminal or the like (step S28), and the reading is completed (step S29), no further display change is performed, and the light emitting element dot matrix is turned off after a lapse of a predetermined time (step S32).

In contrast to this, when the error correction capability is exceeded and reading is not completed, the display position of the two-dimensional code 3 is moved or rotated to conduct the display (step S30). The movement/rotation here may be performed a plurality of times, or may be performed in combination with the movement/rotation. However, the movement/rotation is performed within the range of the error correction capability for the above-described bulb-burnout.

When reading is completed due to the movement or rotation of the display position of the two-dimensional code 3 (step S31), the light emitting element dot matrix is turned off after a predetermined time has elapsed (step S32).

Note that the determination as to whether it is within the range of the error correction capability or not is made at step S23, step S26, and step S29, but the determination as to whether it is within the range of the error correction capability at step S23 and step S26 is a determination about a bulb-burnout, which is determined inside the operation display panel built-in article 1 without using a reading device such as a mobile phone, while the determination in the step S29 is conducted by user himself or herself determining the success or failure of the reading upon using a reading apparatus such as a mobile phone and a method such as the user operates a switch inside the operation display panel built-in article 1 is employed.

INDUSTRIAL APPLICABILITY

The present invention is useful as a method for displaying a two-dimensional code that is harmonized with buildings and furniture and does not impair the texture of the space. It can also be used in a payment system using a two-dimensional code.

DESCRIPTION OF SYMBOLS

1 Operation display panel built-in article
2 Display unit
2a~2p Display cell 3 Two-dimensional code
3a Two-dimensional code display area
3b Movable area
4 Light emission state
5 Non-light emission state
6 Wood grain
7 Bulb-burnout state
8 Wood veneer
9 Transparent base material
10 Touch panel sheet
11 Light guide
11a Guide hole
12 LED array
13 LED light source
14 Operation display panel unit
15 Housing
16a~16c Light
G Gap
H Height
W Width

What is claimed is:

1. A display method for displaying a two-dimensional code on a display panel, the display panel disposed on an outer peripheral surface of a casing which includes a thin layer made of a naturally derived wood, a natural fiber, a natural leather, a natural stone, a synthetic fiber imitating a natural appearance and touch, a synthetic leather imitating a natural appearance and touch, or a synthetic stone imitating a natural appearance and touch, the method comprising:
    determining that a display failure occurred; and
    correcting a display of the two-dimensional code by moving the two-dimensional code or rotating the two-dimensional code, or both.

2. The display method of claim 1,
    wherein the display failure includes a display blur due to variations in a material constituting the thin layer, and
    wherein the method comprises: displaying the two-dimensional code on a display unit of the display panel;
    detecting display blur; and
    correcting the display by moving or rotating the two-dimensional code.

3. The display method of claim 1,
    wherein the display failure includes a failure of a light emitting element provided in the display panel, and
    wherein the method comprises: monitoring a defect of the light emitting element;
    detecting a defect of the light emitting element upon receiving a display request;
    correcting the display by moving or rotating the two-dimensional code; and
    displaying the two-dimensional code on the display unit of the display panel.

4. The display method of claim 1,
    wherein the display failure includes at least one of: display blur due to variations in materials constituting the thin layer and a failure of a light emitting element provided in the display panel, and
    wherein the method comprises: monitoring a defect of the light emitting element;
    receiving a display request and detecting a defect of the light emitting element; and
    performing a first adjustment of the display by moving or rotating the two-dimensional code;
    displaying the two-dimensional code on the display unit of the display panel;
    detecting display blur; and
    performing a second adjustment of the display by moving or rotating the two-dimensional code.

5. The display method of claim 1,
    wherein the display panel has a movement enabling area of 40% to 60% against each of a height and width of the two-dimensional code on a top and bottom or on a left and right side of the display panel in order to move the two-dimensional code.

6. A display device comprising:
    a display panel with a thin layer of a naturally derived wood, a natural fiber, natural leather, a natural stone, a synthetic fiber imitating a natural appearance and touch, a synthetic leather imitating a natural appearance and touch, or a synthetic stone imitating a natural appearance and touch, and
    a correction means for correcting a display of the two-dimensional code on the display panel in response to a display failure.

7. The display device of claim 6, wherein the display failure includes a display blur due to variations in a material constituting the thin layer, and
    the correction means displays a two-dimensional code on the display panel, detects the blur of the display, and adjusts the display by moving or rotating the two-dimensional code.

8. The display device of claim 6, wherein the display failure includes a failure of a light emitting element provided in the display panel, and
    the correction means monitors the failure of the light emitting element, detects a defect of a light emitting element on receiving the display demand, adjusts the display by moving or rotating the two-dimensional code, and displays the two-dimensional code on the display unit of the display panel.

9. The display device of claim 6,
    wherein the display failure includes at least one of: display blur due to variations in materials constituting the thin layer and a failure of a light emitting element provided in the display panel, and
    the correction means monitors a defect of the light emitting element, detects a defect of the light emitting element in response to a display request, adjusts the display by moving or rotating the two-dimensional code, displays the two-dimensional code at a display part of the display panel, and detects uncleanness of the display.

10. The display device of claim 6, wherein the display panel has a movement enabling area of 40% to 60% against each of a height and width of the two-dimensional code on a top and bottom or on a left and right side of the display panel in order to move the two-dimensional code.

11. The display device of claim 7, wherein the display panel has a movement enabling area of 40% to 60% against each of a height and width of the two-dimensional code on a top and bottom or on a left and right side of the display panel in order to move the two-dimensional code.

12. The display device of claim 8, wherein the display panel has a movement enabling area of 40% to 60% against each of a height and width of the two-dimensional code on a top and bottom or on a left and right side of the display panel in order to move the two-dimensional code.

13. The method of claim 2, wherein the method comprises at least one of the following: restricting vertical movement of the two-dimensional code to not extend beyond a movement enabling area on a top and bottom of the display panel which is 40% to 60% a height of the two-dimensional code, or restricting horizontal movement of the two-dimensional code to not extend beyond a movement enabling area on a left and right side of the display panel which is 40% to 60% a width of the two-dimensional code.

14. The method of claim 3, wherein the method comprises at least one of the following: restricting vertical movement of the two-dimensional code to not extend beyond a movement enabling area on a top and bottom of the display panel which is 40% to 60% a height of the two-dimensional code, or restricting horizontal movement of the two-dimensional code to not extend beyond a movement enabling area on a left and right side of the display panel which is 40% to 60% a width of the two-dimensional code.

15. The method of claim 4, wherein the method comprises at least one of the following: restricting vertical movement of the two-dimensional code to not extend beyond a movement enabling area on a top and bottom of the display panel which is 40% to 60% a height of the two-dimensional code, or restricting horizontal movement of the two-dimensional code to not extend beyond a movement enabling area on a left and right side of the display panel which is 40% to 60% a width of the two-dimensional code.

* * * * *